United States Patent [19]

Uddgren

[11] Patent Number: 4,789,871
[45] Date of Patent: Dec. 6, 1988

[54] FLUID SPRAYING HEAD

[75] Inventor: Lars E. Uddgren, Lerum, Sweden

[73] Assignee: Swedot Jet Mark AB, Goeteborg, Sweden

[21] Appl. No.: 161,264

[22] Filed: Feb. 17, 1988

Related U.S. Application Data

[63] Continuation of Ser. No. 57,123, filed as PCT EP86/00554 on Sep. 22, 1986, published as W087/01657 on Mar. 26, 1987, abandoned.

[30] Foreign Application Priority Data

Sep. 20, 1985 [SE] Sweden ............................... 8504377

[51] Int. Cl.⁴ ............................................. G01D 15/18
[52] U.S. Cl. .................................. 346/75; 346/140 R; 400/126
[58] Field of Search ................... 346/75, 140; 400/126, 400/124; 101/93.05

[56] References Cited

U.S. PATENT DOCUMENTS 4,215,350  7/1980  Mielke ................................... 346/75
4,376,944  3/1983  Reitberger .......................... 346/140
4,378,564  3/1983  Cross .................................... 346/75

FOREIGN PATENT DOCUMENTS 3302616  2/1984  Fed. Rep. of Germany .

OTHER PUBLICATIONS

Chironis; Mechanism, Linkages, and Mechanical Controls; 1965; p. 183.
Shinozaki; Patents Abstracts of Japan, vol. 7, No. 120; May 1983: 5838175.

Primary Examiner—Joseph W. Hartary
Attorney, Agent, or Firm—Flynn, Thiel, Boutell & Tanis

[57] ABSTRACT

A fluid spraying head (1) for an ink jet printing device includes a plurality of drop generating elements which are connected to flexible ducts, which in turn are connected to fluid jet nozzles. The fluid jet nozzles are displaceably arranged in respective slots of first and second guiding members (5, 7). The height or size of printing patterns generated by the fluid spraying head onto an object which is moved relative to the fluid spraying head can be varied by changing the relative position of the first and second guiding member (5, 7) with respect to each other.

5 Claims, 1 Drawing Sheet

U.S. Patent      Dec. 6, 1988      4,789,871
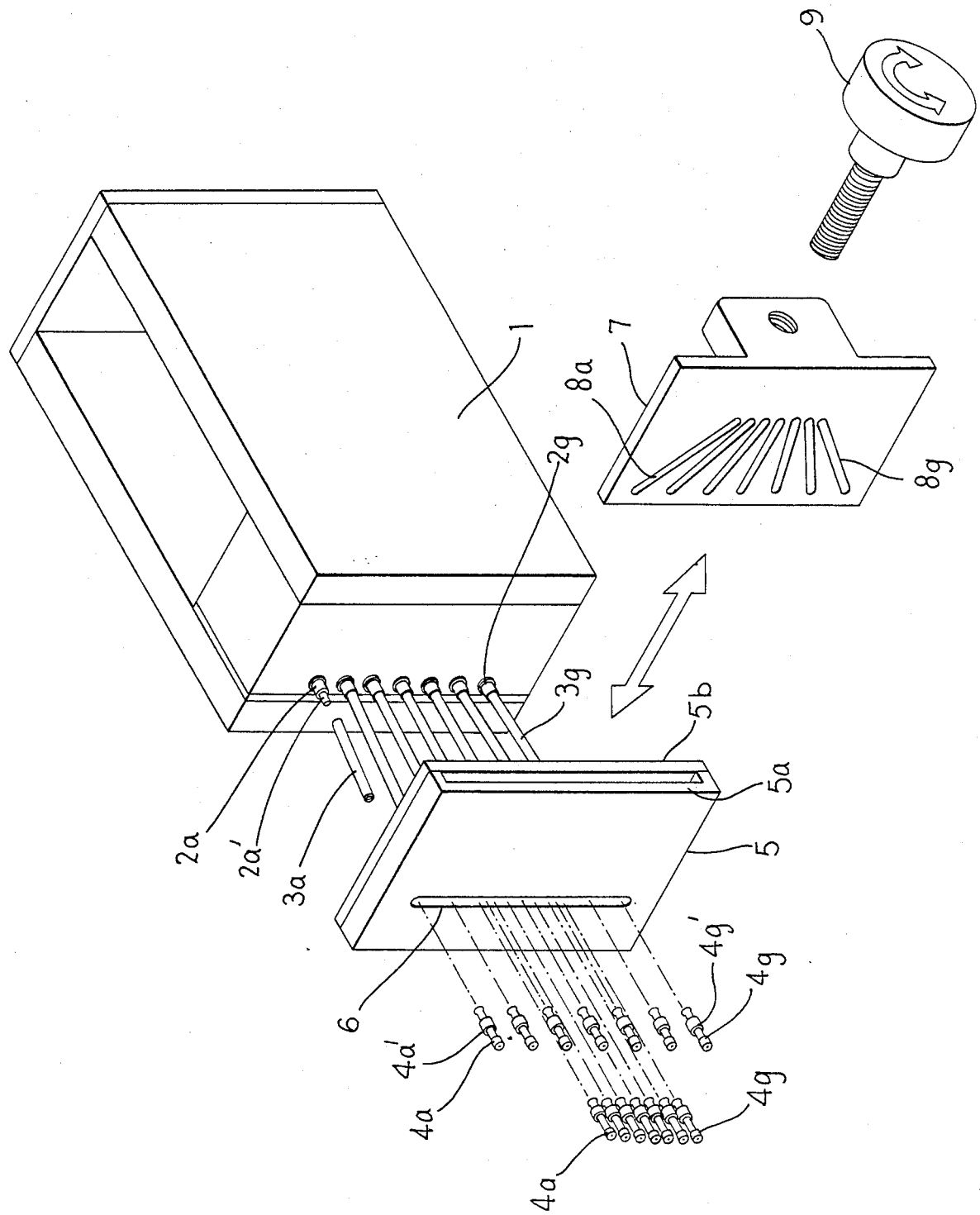

FLUID SPRAYING HEAD

This application is a continuation of U.S. Ser. No. 057,123, filed as PCT EP86/00554 on Sep. 22, 1986, published as WO87/01657 on Mar. 26, 1987, abandoned.

The present invention relates to a fluid spraying head.

Ink jet printing devices having a fluid spraying head are usually used for applying information pattern, characters, letters or figures on objects to be marked, like packages, which are advanced with respect to the spraying head during the ink jet printing operation. Ink jet printing devices have a plurality of ink jet nozzles arranged at the fluid spraying head and a plurality of drop generating elements connected to said nozzles, which drop generating elements might have the form of electromagnetically operated valves for connecting and disconnecting the respective nozzles to a supply of pressurized ink. The respective drop generating elements or valves are controlled by a pattern generator adapted for selecting a number of valves for forming a row-like drop pattern extending transversely of the direction of the relative movement of the object with respect to the fluid spraying head. By repeatedly spraying row-like dot patterns on the object during its movement with respect to the fluid spraying head, which row of dots or spots together form desired information patterns.

It is desirable to use a single fluid spraying head for printing patterns or characters of different sizes, i.e. of different heights.

Numerous solutions for obtaining the adjustability of the height of information pattern printed by fluid spraying heads are already known in the art. For example, a prior art fluid spraying head adapted for ink jet printing of characters with variable height is known from U.S. Pat. No. 4,215,350. At the prior art ink jet printing device, the height of the information pattern or of the characters to be printed can be varied by means of switches for selecting a desired group of valves to be actuated, wherein one group of nozzles is composed of every second nozzle of the other group of nozzles.

Another ink jet printing device adapted for printing information pattern of variable height is known from European Publication No. 088 630. The size of the characters to be printed can be varied by activating different selected nozzles within the printing head. Thus, the prior art device essentially corresponds to that known from U.S. Pat. No. 4,215,350.

A further ink jet printing device adapted for generating characters of variable height is known from German Reference No. 33 02 616. The prior art ink jet printer known from this reference has a rotatable fluid spraying head. When rotating the fluid spraying head for inclining the row of nozzles installed in the spraying head with respect to the usual direction perpendicular to the direction of the movement of the object to be printed, the height of the pattern is reduced. Although the turning or rotating of the fluid spraying head is a simple measure for reducing the height of the respective dot column, it necessitates a relatively complicated sequential control of the respective valves depending on the angular offset of the nozzle row with respect to the vertical direction.

In view of this state of the art, the present invention is based on the object of how to achieve a fluid spraying head of the above mentioned kind which is adapted for generating information pattern or characters of variable height and which can be controlled by a relatively simple control unit or pattern generator.

At the fluid spraying head in accordance with the present invention, the height of the characters or information pattern can be changed without requiring any changes in the control by means of the pattern generator or control unit connected to the drop generating elements or solenoid valves. As an essential further aspect of the present invention, the fluid spraying head can be implemented by simply adding the group of flexible ducts and the two guiding members to a prior art fluid spraying head having a fixed distance between the respective fluid channels located in the head. Hence, a prior art fluid spraying head only capable of printing information pattern of a predetermined size can be changed and adapted for printing information pattern of variable height.

Hereinafter, a preferred embodiment in accordance with the present invention will be described with reference to the attached single drawing, which shows a perspective view of an embodiment of a fluid spraying head in accordance with the present invention.

A fluid spraying head 1, which is preferably used in an ink jet printing device includes a plurality of drop generating elements (not shown in the drawing) which are usually formed by electromagnetic valves connected to a container for pressurized ink. These drop generating elements are connected to fluid channels 2a–2g having fluid channel end portions 2a'–2g' or outlet openings which are arranged in a straight vertical line at a fixed distance from each other. This fixed distance, the so-called pitch distance, is usually approximately 4 mm. The flexible ducts 3a–3g are connected to the respective end portions 2a'–2g' of said fluid channels 2a–2g. The flexible duct preferably consist of plastic material and have a length of about 20 mm. The flexible ducts 3a–3g are connected to ink jet nozzles or fluid spraying nozzles 4a–4g which nozzles preferably consist of stainless steel. Each nozzle 4a–4g has a guiding portion or slide portion 4a'–4g'.

The fluid spraying head 1 further comprises a first guiding member in the form of a first, fixed nozzle plate 5 having two parallel, spaced apart walls 5a, 5b. Each wall 5a, 5b of the first, fixed nozzle plate 5 has a first slot 6 in a direction essentially perpendicular to the direction of movement of the object, onto which a pattern is to be printed with respect to the fluid spraying head 1. The sliding portion 4a–4g' is adapted to slide within the first slot 6. A second guiding member in the form of a movable nozzle plate 7 arranged between the walls of the first fixed nozzle plate 5 can be moved in a second direction essentially perpendicular to a first direction defined by the extension of the first slot 6. The second movable nozzle plate 7 has a number of second slots 8a–8g which are angularly offset with respect to each other. A respective one of the guiding or sliding portions 4a'–4g' of the nozzles 4a–4g is displaceably arranged in a respective one of the second slots 8a–8g, of the second movable nozzle plate 7.

The position of the movable second nozzle plate 7 between the walls 5a, 5b of the fixed first nozzle plate 5 can be adjusted by turning an adjustment screw 9 engaging with both nozzle plates. The adjustment screw 9 can be a manually controlled screw in the simple case. In a more sophisticated version of the embodiment the adjustment screw 9 can be electrically actuated by means of a drive motor, which is controlled by means of the control unit or pattern generator of the ink jet printing device. Hence, the height of information pattern can be adjusted by controlling the position of the nozzle plate 7 in the course of the printing process.

When moving the second nozzle plate with respect to the first one, the nozzles 4a'-4g' are displaced in the vertical direction due to the co-action of the second slots with the first vertical slot.

The above described embodiment is adapted to be able to easily change the height of the printing pattern on the object to be marked through adjusting the position of the movable plate 7 with respect to the fixed nozzle plate 5.

After the preferred embodiments are equipped with a single slot for guiding all nozzles, the same guiding effect can be achieved by a corresponding number of parallel slots, each slot being arranged to receive a single nozzle.

I claim:

1. Fluid spraying head (1), for an ink jet printer adapted for ink jet printing of characters or information patterns of variable height onto an object movable relative to said head (1), said head (1) including a plurality of drop generating elements and a plurality of nozzles (4a-4g), characterized in that said head (1) comprises a plurality of flexible ducts (3a-3g) connected at one end thereof to respective said drop generating elements of said head (1) and connected at the other end thereof to respective said nozzles (4a-4g);

that said nozzles (4a-4g) are displaceably arranged in first slot means (6) of a first guiding member (5) adapted for guiding said nozzles (4a-4g) in a first direction essentially perpendicular to the direction of relative movement of the object with respect to said head (1);

that each said nozzle (4a-4g) is further displaceably arranged in a respective slot (8a-8g) of a group of second slots (8a-8g) of a second guiding member (7);

that said second guiding member (7) is movable in a direction essentially perpendicular to said first direction; and that the respective directions of extension of said second slots (8a-8g) are angularly offset with respect to each other.

2. Fluid spraying head as claimed in claim 1, characterized in that said first and second guiding members (5,7) have the form of first and second nozzles plates (5,7);

that said first nozzle plate (5) is a fixed plate; and that said second nozzle plate (7) is movable in the direction of relative movement of the object with respect to said head (1).

3. Fluid spraying head as claimed in claim 1, characterized in that said first slot means has the form of a single slot (6) for commonly guiding all said nozzles (4a-4g) in the first direction.

4. Fluid spraying head as claimed in claim 1, characterized in that it comprises a plurality of fluid channels (2a-2g) having end portions (2a-2g) arranged in a straight line at a fixed distance from each other, said fluid channels (2a-2g) extending to said drop generating elements, and that said flexible ducts (3a-3g) are connected at one end thereof to respective said end portions (2a-2g).

5. Fluid spraying head as claimed in claim 1, characterized by an adjustment screw (9) engaging said first and second guiding members (5,7) for adjusting the relative position of said guiding members (5,7) to thereby adjust the height of the characters or of information pattern to be printed.

* * * * *